(12) United States Patent
Emerson et al.

(10) Patent No.: US 7,505,170 B2
(45) Date of Patent: Mar. 17, 2009

(54) CONVERSIONS BETWEEN SPOOL FILES AND PDL WITHIN A PIPELINE OF MODULAR FILTERS

(75) Inventors: Daniel Emerson, Redmond, WA (US); Adrian Maxa, Kirkland, WA (US); Khaled Sedky, Sammamish, WA (US); Oliver Foehr, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 626 days.

(21) Appl. No.: 11/180,983

(22) Filed: Jul. 13, 2005

(65) Prior Publication Data

US 2007/0013930 A1    Jan. 18, 2007

(51) Int. Cl.
*G06F 15/00* (2006.01)
*G06F 3/12* (2006.01)
*G06K 1/00* (2006.01)
(52) U.S. Cl. .................................. 358/1.3; 358/1.13
(58) Field of Classification Search ............... 358/1.13, 358/1.1, 1.15, 1.14
See application file for complete search history.

(56) References Cited

U.S. PATENT DOCUMENTS 7,102,768 B2* 9/2006 Daly et al. ................. 358/1.13

OTHER PUBLICATIONS

Uchida (US 2004/0263892 A1);Sedky et al. (US Pub. No. 2006/0139673 A1); Sedky et al. (US Pub. No. 2006/0224606 A1);Sedky et al. (US Pub. No. 2006/0126105 A1);Sedky et al. (US Pub. No. 2006/0221382 A1).*

* cited by examiner

*Primary Examiner*—Douglas Q Tran
(74) *Attorney, Agent, or Firm*—Lee & Hayes, PLLC

(57) ABSTRACT

Conversion of spool files to a PDL within a pipeline of modular filters. A spooler is adapted to receive content to be rendered on a destination device, and one or more filters are adapted to render the content on the destination device. In other embodiments, the filters are arranged in a pipeline configuration to execute a variety of functions in connection with rendering the content on the destination device. The filters can convert content in a spool file format into corresponding PDL representations, and vice versa.

20 Claims, 4 Drawing Sheets

CONVERSIONS BETWEEN SPOOL FILES AND PDL WITHIN A PIPELINE OF MODULAR FILTERS

BACKGROUND

Printing content from application software that executes within personal computer operating systems environments, such as the WINDOWS® family of operating systems available from Microsoft Corporation of Redmond, Wash., typically involves several conversion operations. The application can represent the content using a proprietary format. However, in the WINDOWS® environment, the content may be made compatible with a utility such as the Graphics Device Interface (GDI) layer. A first operation can convert the representation of the content that is employed by the application to a spool file format, such as the Encapsulated Metafile (EMF) format. At least a second operation can convert the EMF format to the Printer Description Language (PDL) interpreted by the device. For example, common PDLs include Post-Script, PCL5c, PCL-XL, raster, and the like.

SUMMARY

Conversions between spool files and a PDL within a pipeline of modular filters are described herein. A spooler is adapted to receive content to be rendered on a destination device, and one or more filters are adapted to render the content on the destination device. In other embodiments, the filters are arranged in a pipeline configuration to execute a variety of functions in connection with rendering the content on the destination device. The filters can convert content in a spool file format into corresponding PDL representations, and vice versa. For example, in a scanning or faxing application, the filters may support conversion of PDL representations into a spool file format.

This Summary is provided to introduce a selection of concepts in a simplified form that are further described below in the Detailed Description. This Summary is not intended to identify key features to essential features of the claimed subject matter, nor is it intended to be used as an aid in determining the scope of the claimed subject matter.

BRIEF DESCRIPTION OF THE DRAWINGS

The same numbers are used throughout the drawings to reference like features and components. In the figures, the left-most digit(s) of a reference number identifies the figure in which the reference number first appears. The use of the same reference numbers in different figures indicates similar or identical items.

DETAILED DESCRIPTION

Figure 1:
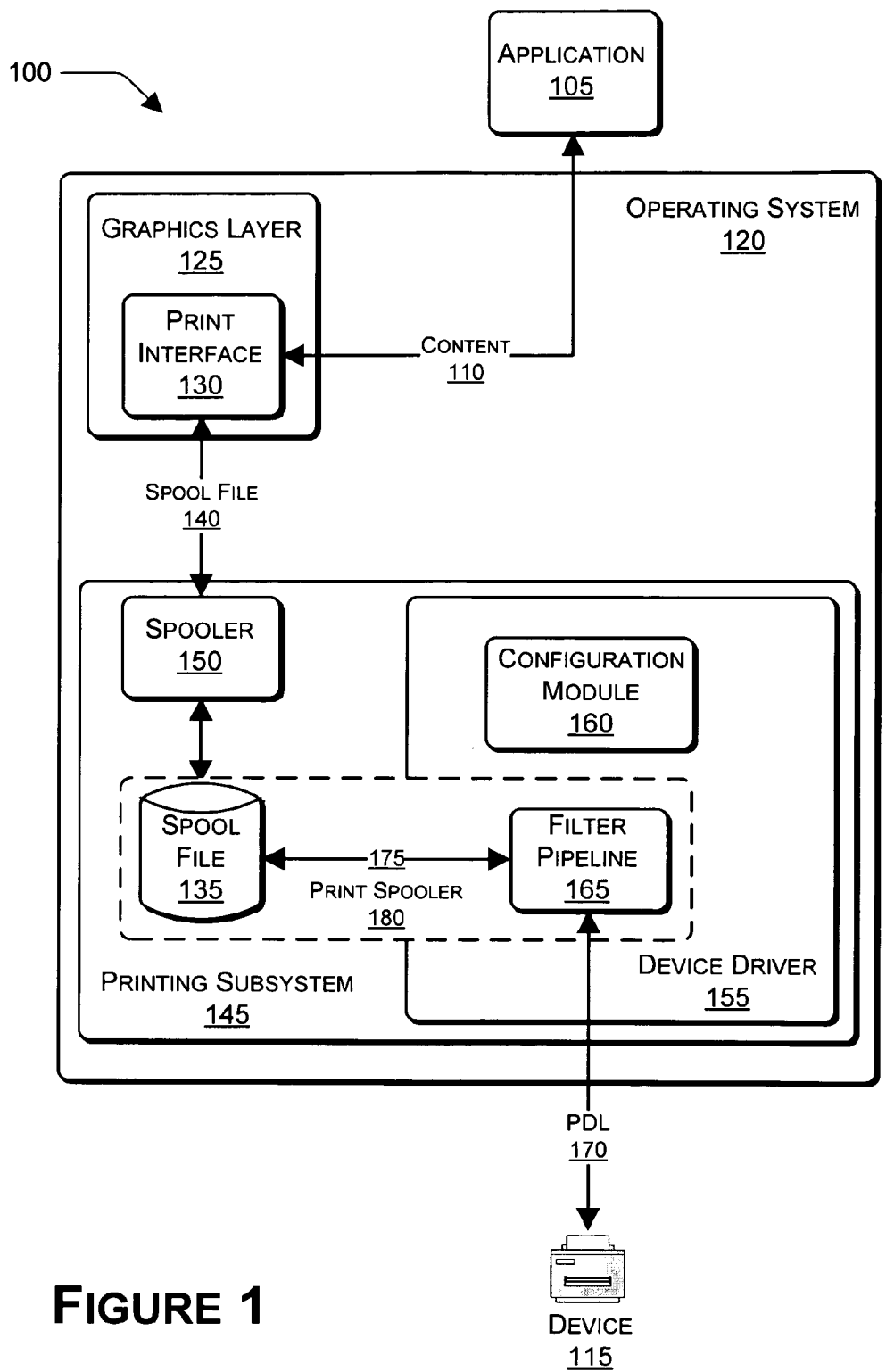
FIG. 1 is a block diagram of an architecture for performing conversions between spool files and a PDL within a pipeline of modular filters.

FIG. 1 illustrates an architecture 100 for performing conversions between spool files and a Printer Description Language (PDL) within a pipeline of modular filters. An application 105 submits a print job in which content 110 is to be printed or otherwise rendered onto a device 115, which can take the form of, for example, any suitable printer. The content 110 is routed to an operating system 120 under which the application 105 is executing. The operating system 120 may be any available operating system, including but not limited to any of the WINDOWS® family of operating systems available from Microsoft.

The operating system 120 can include a graphics layer component 125, a suitable example of which is the GDI layer included in the WINDOWS® family of operating systems. However, other third-party graphics layer components may also be used as well. Included within the graphics layer component 125 is a print interface 130, which can receive and process the content 110 from the application 105. The print interface 130 converts the content 110 into a spool file representation 140 that is suitable for storage in a printing spool file 135. The spool file representation 140 is then forwarded to a printing subsystem 145.

The printing subsystem 145 includes a spooler or spooling process 150 that receives the spool file representation 140 of the content 110 from the print interface 130. The spooling process 150 schedules, for example, a print job for the incoming content 110 on the device 115, and queues the job in the spool file 135 to await processing by a device driver 155 and/or the device 115.

The printing subsystem 145 also includes the device driver 155, which in turn can include a configuration module 160 and a filter pipeline 165. The configuration module 160 can display a User Interface (UI) associated with the device driver 155, as well as expose and process print or other device settings associated with the device 115. The filter pipeline 165 functions generally to interpret content 110 that is stored in the spool file 135, and to convert the same as appropriate into corresponding Printer Description Language (PDL) commands 170. The PDL commands 170 are output from the filter pipeline 165 and can be interpreted by the device 115. For convenience of discussion, but not limitation, the spool file 135, the filter pipeline 165, and the data flow 175 between these components are shown as part of a print spooler 180.

Figure 2:
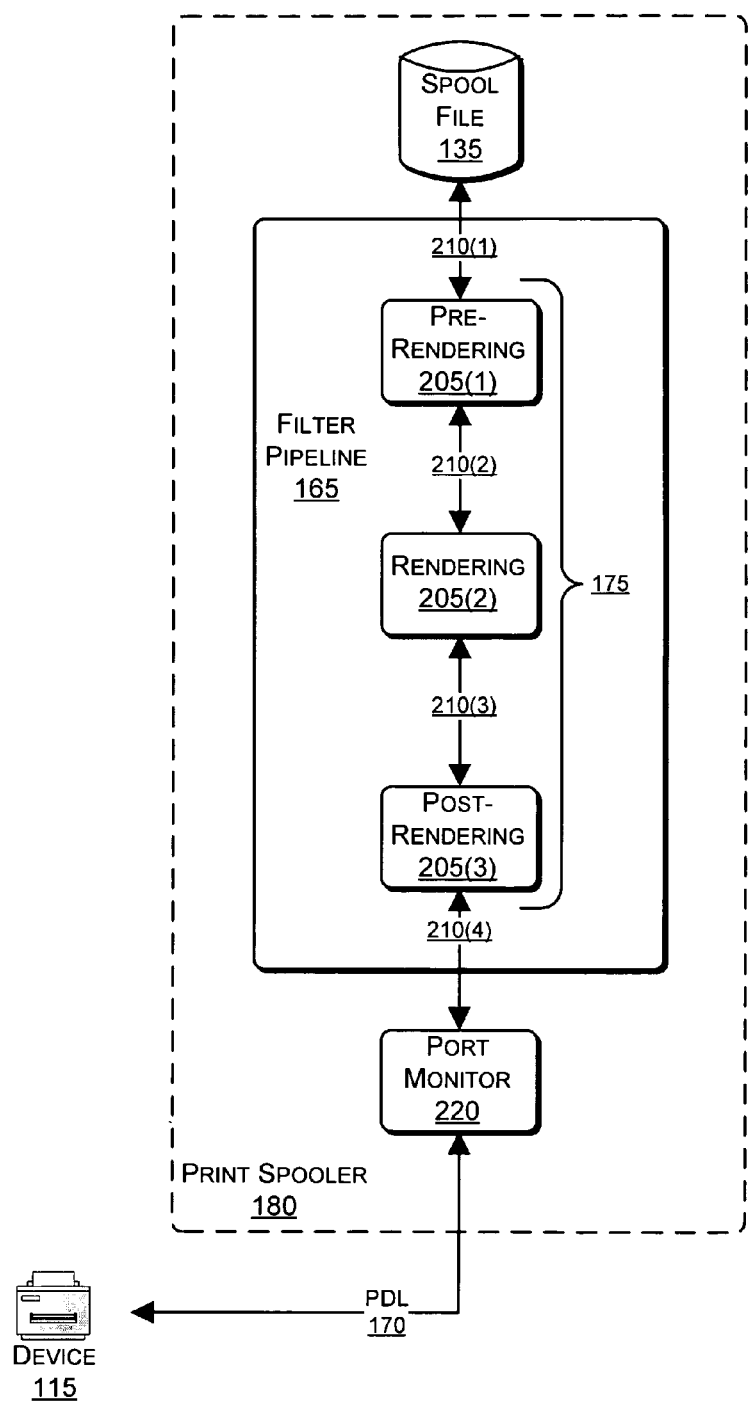
FIG. 2 is a block diagram illustrating further details of the print spooler and related pipeline of filters as shown in FIG. 1.

FIG. 2 illustrates further details of the print spooler 180 and related filter pipeline 165 as shown in FIG. 1. Reference numbers appearing in both FIGS. 1 and 2 refer to identical or similar subject matter. The data 175 read from the spool file 135 is passed to the filter pipeline 165. The filter pipeline 165 can include one or more respective filters 205(1), 205(2), and 205(3), which are referred to collectively herein as filters 205 for convenience. The illustrative implementation shown in FIG. 2 includes three such filters 205 for convenience of discussion and illustration, but this illustrative implementation is understood to be non-limiting. More particularly, these filters 205 could be integrated into one or more common filters 205, or further distributed among any number of filters 205. Further, these filters 205 that define the filter pipeline 165 need not be physically instantiated in a given implementation, but may be considered as logical filters 205 presented herein to organize discussion of various functions.

Turning to these filters 205 in detail, a pre-rendering filter 205(1) can receive the spool data 175 from the spool file 135 as input 210(1). The pre-rendering filter 205(1) performs any pre-processing thereon that is appropriate before the spool data 175 is interpreted into PDL 170 and rendered into tangible output on the device 115. Non-limiting examples of processing performed by the pre-rendering filter 205(1) can include providing a set of print processing features, such as adding watermarks or other similar features to the content 110 passing through the filter pipeline 165. Another example of such processing might include arranging or organizing the content 110 as specified by the application 105, such as organizing the pages of the content 110 for printing in book or pamphlet form, printing the pages in a specified order, or the like.

While FIG. 2 shows one pre-rendering filter 205(1) for convenience and clarity, it is understood that one or more pre-rendering filters 205(1) may be included in implementations of the teachings herein, for example, to perform respective pre-rendering functions. In any event, the pre-rendering filter 205(1) can pass its output 210(2) to a rendering filter 205(2) as input.

The rendering filter 205(2) operates, at least in part, to convert the data 210(2) to a PDL representation that is recognized or interpretable by the device 115, as needed. In so doing, the rendering filter 205(2) renders the content 110 into a format that can be interpreted by the processing engine on the device 115. The rendering filter 205(2) can be realized as one or more filters 205, as with the pre-rendering filter 205(1) discussed above. In any event, the rendering filter 205(2) can pass its output 210(3) to a post-rendering filter 205(3) as input.

A post-rendering filter 205(3) can perform any functions that logically occur after the processing performed by the rendering filter 205(2). Non-limiting examples of such processing can include implementing accounting-related functions, such as tracking numbers of pages printed by particular users or applications 105 for chargeback purposes. The post-rendering filter 215 can be also be used, for example, to check a number of printed pages against pre-defined printing quotas or allocations associated with particular users or groups of users. The post-rendering filter 205(3) can be realized as one or more filters 205, as with the pre-rendering filter 205(1) and rendering filter 205(2) discussed above.

It is understood that the filter pipeline 165 can operate to convert spool formats into PDL formats, for example, in the context of printing. In this case, data would flow from the top to the bottom of the filter pipeline 165 as shown in FIG. 2. It is further understood that the filter pipeline 165 can operate to convert PDL formats into spool formats, for example, in the context of scanning or faxing. In this case, data would flow from the bottom to the top of the filter pipeline 165 as shown in FIG. 2. Also, referring briefly to FIGS. 1 and 2, data may flow from the device 115 through the architecture 100 to the application 105. Accordingly, the arrows shown in FIGS. 1 and 2 symbolize bi-directional data flows. In this context, the device 115 may take the form of, for example, a scanner or fax machine, and the content 110 may take the form of an image of a document produced by the scanner or fax machine. Accordingly, the output of the scanner or fax machine may be converted as appropriate to render the content 110 in, for example, the application 105 for viewing by a user.

The filters 205 can perform their associated functions or services themselves, or they can call services provided by the printing subsystem 145 to perform these functions or services. The filters 205 can also call third-party services to perform these functions, in whole or in part. As a non-limiting example, the printing subsystem 145 can provide a rendering filter or engine 205(2) that converts the spool data 175 into image data that is produced in tangible form on the device 115, i.e., that puts the content 110 onto "paper". The printing subsystem 145 can also provide decomposition services that can operate to resolve transparency, overlap, and other similar issues that arise in connection with rendering particular content 110.

The printing subsystem 145 can further provide configuration services appropriate for particular devices 115 and/or related device drivers 155. More particularly, these configuration services can enable the definition of device parameters for various output options supported by the device 115. For example, if the spool file 135 contains a high-level command to perform a duplexing operation, then the configuration services can return the specific device or PDL commands that turn on or enable duplexing. Also, the configuration services can expose the functionality of the configuration module 160 to the filter pipeline 165.

A port monitor 220 receives the output 210(4) of the filter pipeline 165, and communicates this data to the device 115 using a communications protocol suitable for or used by that device 115. The particular protocol typically varies depending on the device 115.

Figure 3:
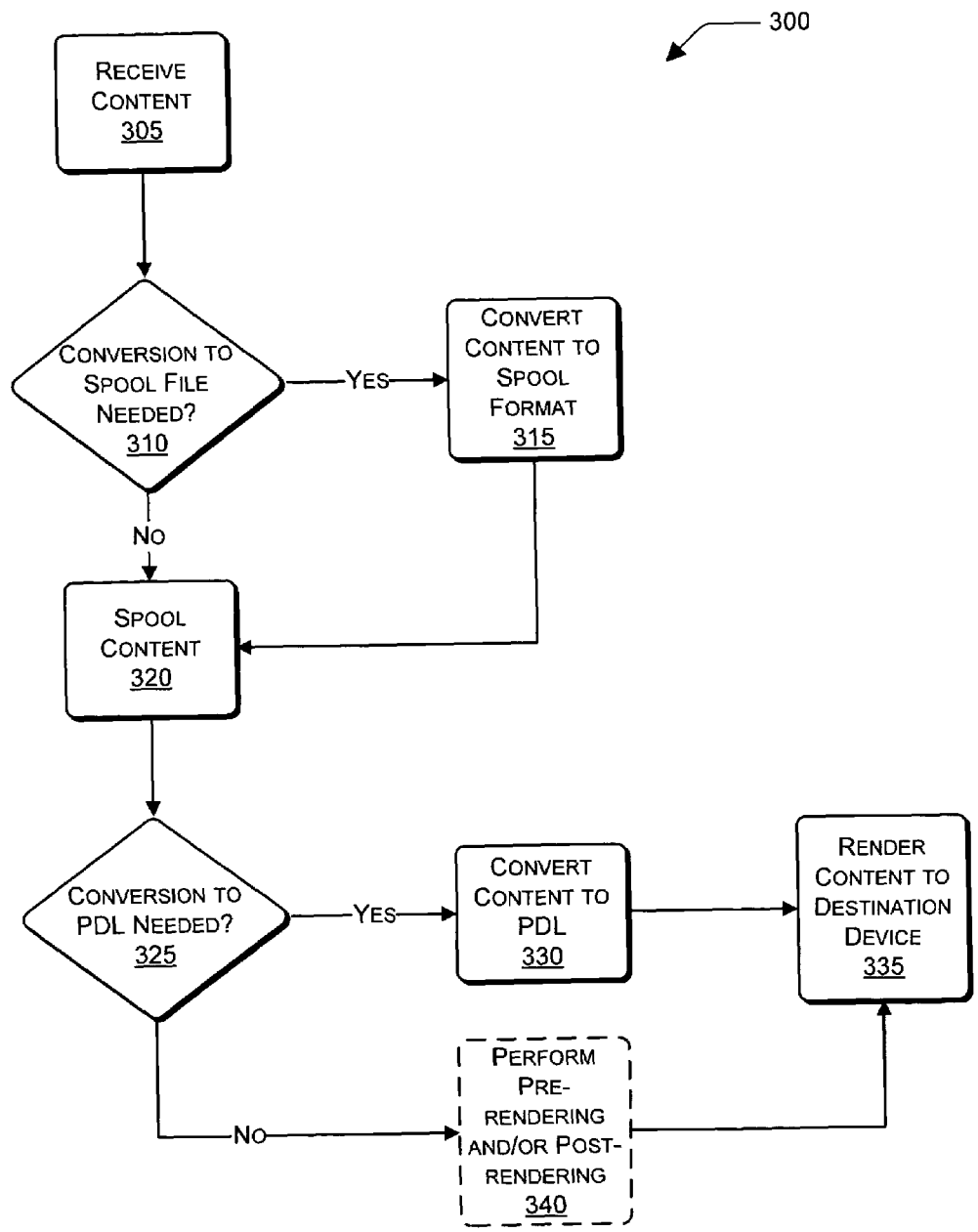
FIG. 3 is a flowchart of a process flow performed by the architecture shown in FIGS. 1 and 2.

FIG. 3 illustrates a process flow 300 performed to convert between spool files and a PDL within a pipeline of filters. While the architecture 100 shown in FIGS. 1 and 2 may be suitable for performing the process flow 300, the process flow 300 may also be performed using other architectures. In block 305, the content 110 is received in connection with a request to render the content on the device 115. In block 310, the process 300 determines whether a conversion of the content 110 to a spool file format is needed. More particularly, the process 300 evaluates whether the content 110 is in a format that is compatible for storage in the spool file 135.

From block 310, if the content 110 is to be converted to a spool-compatible format, the process 300 proceeds to block 315, where the content 110 is converted to a spool-compatible format. Afterwards, the process 300 proceeds to block 320, where the converted content 110 is spooled to the spool file 135. Referring back to block 310, if the content 110 is already compatible with the spool file 135 when received from the application 105, then the content is spooled to the spool file 135 directly in block 320, bypassing block 315.

After the content 110 is spooled to the spool file 135 in block 320, the process 300 proceeds to block 325, where the process 300 determines if any processing is needed, including, but not limited, to evaluating whether a conversion of the content 110 to a PDL format is needed. More particularly, if the content 110 as received by block 325 is not interpretable by the device 115, a conversion to a PDL format that is interpretable by the device 115 is appropriate. From block 325, if a conversion to PDL format is needed, the process 300 proceeds to block 330 to convert the content 110 to a PDL format that is interpretable by the device 115. Afterwards, in block 335, the content 110 is rendered on the device 115.

Referring back to block 325, if the content 110 as received by block 325 is already interpretable by the device 115, then a conversion to PDL format is not needed. In this case, the process 300 can proceed directly to block 335 to render the content 110 on the device 115. Alternatively, the process 300 can pass through a block 340 to perform the pre-rendering or post-rendering operations represented by the blocks 205(1) and 205(3) shown in FIG. 2, within the filter pipeline 165. Block 340 is shown in dashed outline to indicate that where no pre-rendering or post-rendering operations are supported, the process 300 may proceed directly to block 335.

The Metro Specification and Reference Guide is available from Microsoft Corporation, and contains a description of Metro, which is the codename for a set of conventions for the use of XML and other widely available technologies to describe the content and appearance of paginated documents. As such, the Metro convention may serve to provide formats suitable for representing the application content 110, the contents of the spool file 135, and/or the PDL 170. Thus, if the content 110 is compliant with the Metro Specification or a similar format, the content 110 may pass relatively quickly through the process 300 shown in FIG. 3. More particularly, this content 110 would encounter processing blocks 305, 320, and 335, and would avoid conversion blocks 315 and 330 by taking the "No" branches from both decision blocks 310 and 325.

If the content 110 as received from the application 105 is not compliant with the Metro convention or similar specification, then decision block 310 will direct the content 110 to the conversion block 315. The conversion block 315 can convert the content 110 into, for example, the Metro convention or similar specification. Afterwards, the content 110 can be spooled by block 320, and also bypass the conversion block 330 because the Metro convention may also serve as a PDL.

It is specifically contemplated herein that various vendors or providers of devices 115 and/or device drivers 155 may also provide filters 205 for inclusion in the filter pipeline 165. For example, a manufacturer of a given device 115 may provide a rendering filter 205(2) that converts the content 110 and/or the spool file data 175 into a PDL format 170 that is interpretable by the device 115, and vice versa. In this manner, the modular architecture of the filter pipeline 165 enables any number and/or types of filters 205 to be assembled as appropriate to accomplish given functions. This modular architecture also provides the flexibility to support additional PDLs as they may be released by various developers of devices 115 and/or device drivers 115. This modular architecture further enables conversion from, for example, the Metro format or convention referenced above to any PDL available now or in the future, and vice versa.

Figure 4:
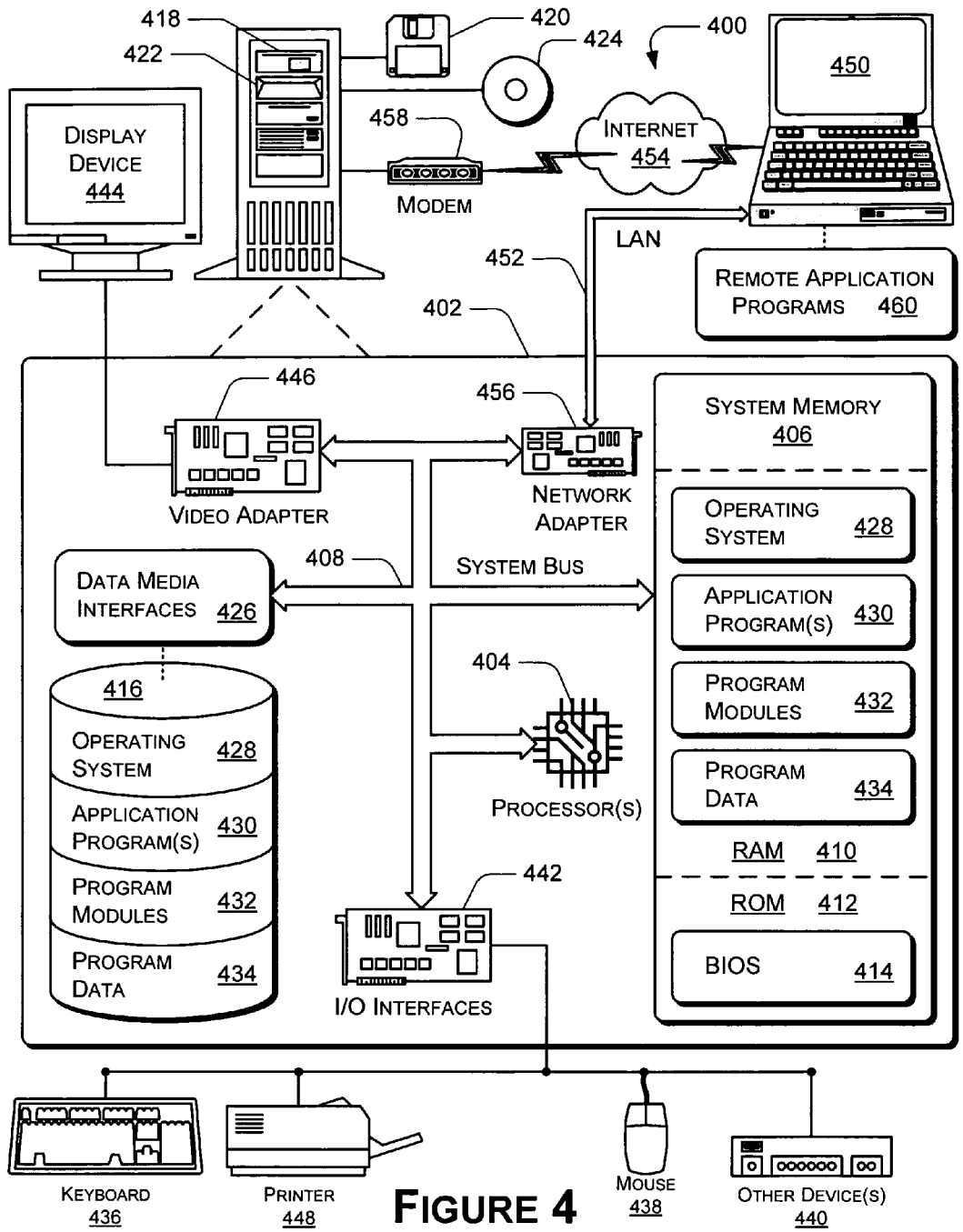
FIG. 4 illustrates an exemplary computing environment within which systems and methods for performing conversions between spool files and a PDL within a pipeline of modular filters, as well as the architectures described herein, can be either fully or partially implemented.

FIG. 4 illustrates an exemplary computing environment 400 within which systems and methods for performing conversions between spool files and a PDL within a pipeline of modular filters, as well as the architecture 100 described herein, can be either fully or partially implemented. Exemplary computing environment 400 is only one example of a computing system and is not intended to suggest any limitation as to the scope of use or functionality of the architectures. Neither should the computing environment 400 be interpreted as having any dependency or requirement relating to any one or combination of components illustrated in the exemplary computing environment 400.

The computer and network architectures in computing environment 400 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 400 includes a general-purpose computing system in the form of a computing device 402. The components of computing device 402 can include, but are not limited to, one or more processors 404 (e.g., any of microprocessors, controllers, and the like), a system memory 406, and a system bus 408 that couples the various system components. The one or more processors 404 process various computer executable instructions to control the operation of computing device 402 and to communicate with other electronic and computing devices. The system bus 408 represents any number of several types of bus structures, including a memory bus or memory controller, a peripheral bus, an accelerated graphics port, and a processor or local bus using any of a variety of bus architectures.

Computing environment 400 includes a variety of computer readable media which can be any media that is accessible by computing device 402 and includes both volatile and non-volatile media, removable and non-removable media. The system memory 406 includes computer readable media in the form of volatile memory, such as random access memory (RAM) 410, and/or non-volatile memory, such as read only memory (ROM) 412. A basic input/output system (BIOS) 414 maintains the basic routines that facilitate information transfer between components within computing device 402, such as during start-up, and is stored in ROM 412. RAM 410 typically contains data and/or program modules that are immediately accessible to and/or presently operated on by one or more of the processors 404.

Computing device 402 may include other removable/non-removable, volatile/non-volatile computer storage media. By way of example, a hard disk drive 416 reads from and writes to a non-removable, non-volatile magnetic media (not shown), a magnetic disk drive 418 reads from and writes to a removable, non-volatile magnetic disk 420 (e.g., a "floppy disk"), and an optical disk drive 422 reads from and/or writes to a removable, non-volatile optical disk 424 such as a CD-ROM, digital versatile disk (DVD), or any other type of optical media. In this example, the hard disk drive 416, magnetic disk drive 418, and optical disk drive 422 are each connected to the system bus 408 by one or more data media interfaces 426. The disk drives and associated computer readable media provide non-volatile storage of computer readable instructions, data structures, program modules, and other data for computing device 402.

Any number of program modules can be stored on RAM 410, ROM 412, hard disk 416, magnetic disk 420, and/or optical disk 424, including by way of example, an operating system 428, one or more application programs 430, other program modules 432, and program data 434. Each of such operating system 428, application program(s) 430, other program modules 432, program data 434, or any combination thereof, may include one or more embodiments of the systems and methods described herein.

Computing device 402 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 402 via any number of different input devices such as a keyboard 436 and pointing device 438 (e.g., a "mouse"). Other input devices 440 (not shown specifically) may include a microphone, joystick, game pad, controller, satellite dish, serial port, scanner, fax machine, and/or the like. These and other input devices are connected to the processors 404 via input/output interfaces 442 that are coupled to the system bus 408, but may be connected by other interface and bus structures, such as a parallel port, game port, and/or a universal serial bus (USB).

A display device 444 (or other type of monitor) can be connected to the system bus 408 via an interface, such as a video adapter 446. In addition to the display device 444, other output peripheral devices can include components such as speakers (not shown) and a printer 448 which can be connected to computing device 402 via the input/output interfaces 442.

Computing device 402 can operate in a networked environment using logical connections to one or more remote computers, such as remote computing device 450. By way of example, remote computing device 450 can be a personal computer, portable computer, a server, a router, a network computer, a peer device or other common network node, and the like. The remote computing device 450 is illustrated as a portable computer that can include any number and combination of the different components, elements, and features described herein relative to computing device 402.

Logical connections between computing device 402 and the remote computing device 450 are depicted as a local area network (LAN) 452 and a general wide area network (WAN) 454. Such networking environments are commonplace in offices, enterprise-wide computer networks, intranets, and the Internet. When implemented in a LAN networking environment, the computing device 402 is connected to a local network 452 via a network interface or adapter 456. When implemented in a WAN networking environment, the computing device 402 typically includes a modem 458 or other means for establishing communications over the wide area network 454. The modem 458 can be internal or external to computing device 402, and can be connected to the system bus 408 via the input/output interfaces 442 or other appropriate mechanisms. The illustrated network connections are merely exemplary and other means of establishing communication link(s) between the computing devices 402 and 450 can be utilized.

In a networked environment, such as that illustrated with computing environment 400, program modules depicted relative to the computing device 402, or portions thereof, may be stored in a remote memory storage device. By way of example, remote application programs 460 are maintained with a memory device of remote computing device 450. For purposes of illustration, application programs and other executable program components, such as operating system 428, are illustrated herein as discrete blocks, although it is recognized that such programs and components reside at various times in different storage components of the computing device 402, and are executed by the one or more processors 404 of the computing device 402.

Although embodiments of performing conversions between spool files and a PDL within a pipeline of modular filters have been described in language specific to structural features and/or methods, it is to be understood that the subject of the appended claims is not necessarily limited to the specific features or methods described. Rather, the specific features and methods are disclosed as exemplary implementations of performing conversions between spool files and a PDL within a pipeline of modular filters.

What is claimed is:

1. A system comprising:
    a spooler adapted to receive content to be rendered on a device; and
    a filter adapted to convert the content for rendering on the device, the filter being part of a configurable module to process a bi-directional data flow for content to, in a first direction, convert content in a format associated with the spooler to a format associated with a device and to, in a second direction, convert content in a format associated with a device to a format associated with the spooler.

2. The system of claim 1, further comprising a spool file adapted to store an output of the spooler, and wherein the filter is adapted to receive input from the spool file.

3. The system of claim 1, wherein the filter is adapted to perform rendering using a local printing sub-system.

4. The system of claim 1, wherein the filter is adapted to perform rendering using third-party services.

5. The system of claim 1, wherein the filter is adapted to alter rendering for at least one given job based on at least one setting for the device that is specified in a spool file associated with the given job.

6. The system of claim 1, wherein the filter is adapted to produce output that is directly interpretable by the device.

7. The system of claim 1, wherein the filter is included in a device driver associated with the device.

8. The system of claim 1, wherein the filter is included in the spooler.

9. A system comprising:
    a spooler adapted to receive content to be rendered on a device; and
    a pipeline of filters adapted to convert the content for rendering on the device, the pipeline of filters being configurable to process a bi-directional data flow for content to, in a first direction, convert content in a format associated with the spooler to a format associated with a device and to, in a second direction, convert content in a format associated with a device to a format associated with the spooler.

10. The system of claim 9, wherein the pipeline of filters includes a pre-rendering filter, at least one rendering filter, and a post-rendering filter.

11. The system of claim 9, further comprising a spool file adapted to store an output of the spooler, and wherein a first filter of the pipeline of filters is adapted to receive input from the spool file.

12. The system of claim 9, wherein at least one filter of the pipeline of filters is adapted to alter rendering for at least one given job based on at least one setting for the device that is specified in a spool file associated with the given job.

13. The system of claim 9, wherein a last filter of the pipeline of filters is adapted to produce output that is directly interpretable by the device.

14. The system of claim 9, wherein the pipeline of filters is included in the spooler.

15. A method comprising:
    receiving content to be rendered on a device; and
    routing the content to at least one filter that is adapted to convert the content for rendering on the device, the at least one filter being part of a configurable module to process a bi-directional data flow for content to, in a first direction, convert content in a format associated with a spooler to a format associated with a device and to, in a second direction, convert content in a format associated with a device to a format associated with a spooler.

16. The method of claim 15, wherein receiving a request includes receiving a request to print the content on a printer.

17. The method of claim 15, wherein routing the content includes routing the content to a pipeline of filters that is adapted to render the content on the device.

18. The method of claim 15, further comprising converting the content from a spool file format to a format interpretable by the device.

19. The method of claim 18, wherein the converting is performed within a pipeline of filters.

20. The method of claim 18, wherein converting the content includes converting the content into a format directly interpretable by the device.

* * * * *

UNITED STATES PATENT AND TRADEMARK OFFICE
CERTIFICATE OF CORRECTION

PATENT NO. : 7,505,170 B2
APPLICATION NO. : 11/180983
DATED : March 17, 2009
INVENTOR(S) : Daniel Emerson et al.

It is certified that error appears in the above-identified patent and that said Letters Patent is hereby corrected as shown below:

In Title page, in field (54), under "Title" column 1, line 2, after "AND" insert -- A --.

In column 1, line 2, after "AND" insert -- A --.

Signed and Sealed this
Tenth Day of May, 2011

David J. Kappos
*Director of the United States Patent and Trademark Office*